US011897232B2

(12) United States Patent
Li et al.

(10) Patent No.: US 11,897,232 B2
(45) Date of Patent: *Feb. 13, 2024

(54) GLAZING WITH OPTICAL DEVICE

(71) Applicant: AGC GLASS EUROPE, Louvain-la-Neuve (BE)

(72) Inventors: Meijie Li, Louvain-la-Neuve (BE); Yannick Sartenaer, Vedrin (BE); Quentin Fraselle, Mont Saint Guibert (BE); Marek Novotny, Namur (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,926

(22) Filed: Jan. 23, 2023

(65) Prior Publication Data

US 2023/0150247 A1 May 18, 2023

Related U.S. Application Data

(63) Continuation of application No. 17/265,117, filed as application No. PCT/EP2019/069521 on Jul. 19, 2019, now Pat. No. 11,613,104.

(30) Foreign Application Priority Data

Aug. 3, 2018 (EP) .................................... 18187286
Oct. 23, 2018 (EP) .................................... 18202028

(51) Int. Cl.
B32B 17/10 (2006.01)
B60J 1/02 (2006.01)
G01S 17/931 (2020.01)

(52) U.S. Cl.
CPC ...... *B32B 17/10036* (2013.01); *B32B 17/101* (2013.01); *B32B 17/10449* (2013.01); *B60J 1/02* (2013.01); *G01S 17/931* (2020.01)

(58) Field of Classification Search
None
See application file for complete search history.

(56) References Cited

U.S. PATENT DOCUMENTS

| 4,973,511 A | 11/1990 | Farmer |
| 11,613,104 B2 * | 3/2023 | Li ..................... B32B 17/10229 |
| | | 428/426 |

(Continued)

FOREIGN PATENT DOCUMENTS

| DE | 10 2014 017 388 A1 | 5/2016 |
| EP | 1 464 632 A1 | 10/2004 |

(Continued)

OTHER PUBLICATIONS

International Search Report dated Sep. 18, 2019 in PCT/EP2019/069521 filed Jul. 19, 2019.

(Continued)

*Primary Examiner* — David Sample
(74) *Attorney, Agent, or Firm* — Oblon, McClelland, Maier & Neustadt, L.L.P.

(57) ABSTRACT

A laminated glazing with an optically transparent area including at least one inner and one outer glass sheet, each having an internal and an external face, and being high level of near infrared radiation transmission glass sheets, at least one thermoplastic interlayer to laminate the at least the inner and the outer glass sheets, including at least a first zone and a second zone, the second zone being delimited by the optically transparent area, and at least one optical sensor device provided on the inner face of the inner pane integrated in the optically transparent area. The thermoplastic interlayer further includes a second zone delimited by the optically transparent area where the laminated glazing has a value of infrared transmission TIR1 higher than the value of (Continued)

infrared transmission TIR2 of the first zone for the working wavelengths of the optical device.

17 Claims, 1 Drawing Sheet

(56) References Cited

U.S. PATENT DOCUMENTS

| | | |
|---|---|---|
| 2004/0160688 A1 | 8/2004 | Noguchi et al. |
| 2006/0250711 A1 | 11/2006 | Noguchi et al. |
| 2010/0189996 A1 | 7/2010 | Torr et al. |
| 2011/0199674 A1 | 8/2011 | Melcher |
| 2019/0225534 A1 | 7/2019 | Fedullo et al. |
| 2020/0376815 A1* | 12/2020 | Mannheim Astete ............ B32B 17/10917 |

FOREIGN PATENT DOCUMENTS

| | | |
|---|---|---|
| WO | WO-2015091106 A | 6/2015 |
| WO | WO 2018/015312 A1 | 1/2018 |
| WO | WO-2018178284 A | 10/2018 |

OTHER PUBLICATIONS

Osram Opto Semiconductors "Low-cost LIDAR—a key technology to enable autonomous driving in urban environments." (Year: 2015).
Polyvinyl acetal. Encyclopedic Dictionary of Polymers pp. 771 (Year: 2007).

* cited by examiner

GLAZING WITH OPTICAL DEVICE

This Application is a continuation of U.S. application Ser. No. 17/265,117, filed Feb. 1, 2021, pending, which is a 371 application of PCT/EP2019/069521 filed Jul. 19, 2019, and claims the benefit of EP Application 18202028.9, filed Oct. 23, 2018 and EP Application 18187286.2, filed Aug. 3, 2018. The contents of each of these applications are incorporated herein by reference in their entirety.

The invention concerns a glass comprising an optical sensor and more particularly an infrared-based remote sensing device such as a LiDAR sensor. More particularly, the invention concerns a glass comprising an optical sensor to be integrated behind a laminated glazing in an autonomous car.

Many motor vehicles, airplanes, helicopters, and ships are equipped with various optical sensors. Examples of optical sensors are camera systems, such as video cameras, night vision cameras, residual light amplifiers, passive infrared detectors such as FUR (forward looking infrared) or infrared-based remote sensing device, such as LiDAR sensing device. The camera systems can use light in the ultraviolet (UV), visible (VIS), and infrared wavelength range (IR).

In motor vehicles, these camera systems or infrared-based remote sensing device, such as LiDAR sensing device can be placed behind the windshield inside the passenger compartment. Thus, they offer the capability of detecting hazardous situations and obstacles in a timely manner even in road traffic.

Other areas that use optical sensors include electronic distance measurement (EDM), for example, using laser distance meters. The distance to other motor vehicles can be determined. Such systems are common in the military field of application, but there are also many possibilities for civilian use. By measurements of the distance to the preceding vehicle, it is possible to determine the necessary safety distance and to significantly increase traffic safety. With automatic warning systems, the danger of a rear-end collision is significantly reduced.

It is also known that windshield has integrated LiDAR. However, the new generation of LiDAR is more demanding in terms of optical properties and are therefore not fully compatible with conventional windshield configurations. In particular, since a thermic glass or coated glasses and particularly coated windshield are more and more used by car manufacturer for thermal comfort reasons.

It is also known that integration of sensor behind the upper part of the windshield involves other advantages such as a good position for geometrical distance estimation, a better view on the road surface and a good overview on traffic situation. In addition, this locations also offers a recurrent aperture cleaning by the wipers, a low risk for stone scratches, a seamless aesthetic and more generally a better controlled environment to operate the sensor. Thus, there is a need for an alternative to the use of imposing and unaesthetic LiDAR sensors such as "mushrooms" for autonomous cars or LiDAR integrated in other sensitive locations such as the bumpers or headlight systems.

According to the present invention, the infrared-based remote sensing device LiDAR sensors are new generation LiDARs based on scanning, rotating, flashing or solid state LiDARs and enabling 3D mapping of the surroundings around the vehicle. Thus, the IR based sensor allows to make precise mapping of the surrounding of the vehicle which is used to drive correctly the autonomous car and to prevent any shock with an obstacle.

LiDAR (also written Lidar, LIDAR or LADAR) is a technology that measures distance by illuminating a target with an infrared (IR) laser light. They are particularly scanning, rotating, flashing or solid state LiDARs. The scanning or rotating LiDARs are using moving lasers beams while flashing and solid state LiDAR emits light pulses which reflect off objects.

Thus, solutions from prior art can not reply to the requirement for LiDAR new generation particularly because glass with integrated LiDAR was not considered as a possible solution.

More particularly, some optical sensors are requesting high transparency at specific wavelengths to operate properly. Such sensors can be integrated behind glazing in automotive application thanks to dedicated glass compositions exhibiting appropriate transparency in this spectral range. However, when laminated glazing is required for safety reason, the interlayer material may induce additional optical absorption that could interfere with proper sensor operation.

Currently, there is no solution which allows IR signal to go through either the car body or glass parts such as windshield or laminated backlite or laminated sidelite of a car with enough intensity.

Thus, the present invention proposes a solution wherein an optical device and more particularly a LiDAR new generation sensor may be integrated inside the autonomous car combing high detection range, minimal design change and higher safety.

This solution is possible by dint of integration of a LiDAR sensor on a laminated glazing and more particularly a windshield or more generally speaking a laminated automotive glazing that exhibits a sufficient IR transmission for the sensor to operate properly.

For simplicity, the numbering of the glass sheets in the following description refers to the numbering nomenclature conventionally used for glazing. For a laminated glazing, the glass sheet in contact with the outside environment the vehicle is known as the side 1 and the surface in contact with the internal part, namely the passenger compartment, is called face 4.

For avoidance of doubt, the terms "external" and "internal" refer to the orientation of the glazing during installation as glazing in a vehicle.

Also for avoidance of doubt, the present invention is applicable for all means of transport such as automotive, train, plane . . . but also other vehicles like drones, . . . .

Thus, the present invention concerns a laminated glazing with an optically transparent area comprising:
- at least one inner and one outer glass sheets, each having an internal and an external faces, and being high level of near infrared radiation transmission glass sheets,
- at least one thermoplastic interlayer to laminate the at least the inner and the outer glass sheets, comprising at least a first zone and a second zone, the zone being delimited by the optically transparent area,
- at least one optical device provided on the inner face of the inner pane integrated in the optically transparent area.

According to the invention, the thermoplastic interlayer comprises a second zone delimited by the optically transparent area where the laminated glazing has a value of infrared transmission TIR1 higher than the value of infrared transmission TIR2 of the first zone, for the working wavelengths of the optical device.

According to the present invention, TIR means infrared transmission ie percentage of the infrared radiation transmitted (between 750 and 2500 nm) by a product, calculated according to standard ISO 9050: 2003. In the context of the invention, the expression "optically transparent sensor area" refers to the part of the glazing that supplies the optical sensor with the relevant optical and electromagnetic data or signals. This can be any part of the pane or an inserted pane segment that has high transmission for the relevant optical and electromagnetic signals. The optically transparent sensor area preferably occupies less than 10%, preferably less than 5% of the surface of the pane, more preferably less than 2%, and more preferably less than 1% of the surface of the pane. For example, for automotive glazing, the optically transparent sensor area wherein the optical device and more particularly a Lidar will be placed.

The optical sensor device preferably comprises cameras for visible light of wavelengths from 400 nm to 750 nm and infrared light of wavelengths from 750 nm to 1650 nm.

According to the present invention, glass sheets may be flat or curved glass, float glass, quartz glass, borosilicate glass, soda lime glass.

According to one embodiment of the present invention, the laminated glazing comprises at least a thermoplastic interlayer comprising in the first zone a thermoplastic interlayer made of polyvinyl butyral which commonly used for laminated glazing and more particularly for automotive glazing, plane glazing . . . and the material of the thermoplastic interlayer of the second zone is made of a material having a TIR higher than the polyvinyl butyral.

According to one embodiment of the present invention, TIR1 at the working wavelength of the optical device should be higher than TIR2, preferably higher than 90%, which approaches the theoretical limit defined by Fresnel equations.

According to one embodiment of the present invention, the working wavelength of the optical device is in IR range, preferably from 750 nm to 1650 nm, preferably from 1530 to 1560 nm.

According to one embodiment of the present invention, the laminated glazing comprises at least a thermoplastic interlayer comprising the first zone of the thermoplastic interlayer is made of polyvinyl butyral, well-known as PVB, and the material of the thermoplastic interlayer of the second zone is chosen amongst ethylene vinyl acetate (EVA), Cyclic olefin polymer (COP), polyurethane (PU).

It is understood that any suitable thermoplastic interlayer answering the requested properties may be used.

The thermoplastic interlayer such as ethylene vinyl acetate (EVA), Cyclic olefin polymer (COP), polyurethane (PU) have a high TIR which helps optical sensors to work optimally.

According to one embodiment of the present invention, the laminated glazing comprises at least a thermoplastic interlayer comprising the first zone made of polyvinyl butyral covering the main surface of the glazing and provided with a frame wherein a piece of thermoplastic interlayer corresponding to the second zone of the thermoplastic interlayer chosen amongst ethylene vinyl acetate, Cyclic olefin polymer (COP), polyurethane is placed inside the frame.

Thus, a small piece in the dimension of the optically transparent area of thermoplastic interlayer with optimal properties to allow the optical sensor to work optimally will be applied locally and particularly in the optically transparent area where the optical sensor will be placed while keeping the standard material such as PVB. The main vision area of the windshield being still assembled with standard PVB to ensure lower cost and better mechanical resistance, and also to comply automotive standards. Indeed, PVB is classically used to laminate automotive windshield to answer particularly to EC43 standards.

Classically, in laminated glazing, a standard solution is to use PVB as thermoplastic interlayer to laminate at least two glass sheets on the whole surface of the glazing. However, as mentioned above the PVB is not sufficient in term of transparency at specific wavelengths to let optical sensors and more particularly more advanced optical sensors like LiDAR. Thus, a solution to solve this issue is to use an alternative interlayer material on the whole glazing ie same interlayer with same properties on the whole glazing. However, this may imply technical (mechanical properties, haze, . . . ) or cost drawbacks. Therefore, the present invention provide a simple and easy solution to improve the quality of image/information detected by the optical sensors according to the present invention.

In recent years, according to increase of demand for high-functional windshields for improving light-weight or amenity of e.g. automobiles, windshields having various functions have been devised. For an interlayer in a laminated glass for such a high-functional windshield such as a laminated glass having an increased ability to insulate sounds (hereinafter also referred to as laminated insulated glass), often a multi-layer interlayer formed by laminating resin layers having various functions is employed. For example, the multi-layer interlayer may be provided with an wedge angle to be used in combination with a head-up display (HUD). Such as multi-layer interlayer is described in the patent EP1800855B.

Thus, the present invention proposed a solution to improve the performances of the optical sensors by applying only locally an alternative interlayer in the optically transparent area ie in the area of the sensor integration area while keeping the standard material in the rest of the piece by using for example a die-cut interlayer material insert (=second zone) that are assembled accordingly before the lamination process.

According to an embodiment of the present invention, the optical device is an infrared-based remote sensing device operating in the wavelength range from 750 to 1650 nm. The optical device is placed on the internal face of the glass sheet in a zone free of the infrared filter.

According to an embodiment of the present invention, the glass sheet has an absorption coefficient comprised between $5$ $m^{-1}$ and $15$ $m^{-1}$ in the wavelength range from 750 to 1650 nm. To quantify the low absorption of the glass sheet in the infrared range, in the present description, the absorption coefficient is used in the wavelength range from 750 to 1650 nm. The absorption coefficient is defined by the ratio between the absorbance and the optical path length traversed by electromagnetic radiation in a given environment. It is expressed in $m^{-1}$. It is therefore independent of the thickness of the material but it is function of the wavelength of the absorbed radiation and the chemical nature of the material.

In the case of glass, the absorption coefficient ($\mu$) at a chosen wavelength $\lambda$ can be calculated from a measurement in transmission (T) as well as the refractive index n of the material (thick=thickness), the values of n, p and T being a function of the chosen wavelength $\lambda$:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right] \text{ with}$$

$$\rho = (n-1)^2/(n+1)^2.$$

The glass sheet according to an embodiment of the present invention preferably has an absorption coefficient in the wavelength range of 750-1650 nm, generally used in optical technologies relating to the invention, very low compared to conventional glasses. In particular, the glass sheet according to the invention has an absorption coefficient in the wavelength range from 750 to 1650 nm comprised between 5 m$^{-1}$ and 15 m$^{-1}$.

Preferably, the glass sheet has an absorption coefficient in the wavelength range from 750 to 1650 nm between 5 m$^{-1}$ and 10 m$^{-1}$.

A low absorption presents an additional advantage that the final IR transmission is less impacted by the optical path in the material. It means that for large field of view (FOV) sensors with high aperture angles the intensity perceived at the various angles (in different areas are the image) will be more uniform, especially when the sensor is optically coupled to the glazing.

Thus, when an autonomous vehicle encounters an unexpected driving environment unsuitable for autonomous operation, such as road construction or an obstruction, vehicle sensors through the glazing according to the invention can capture data about the vehicle and the unexpected driving environment. The captured data can be sent to a remote operator or to the central intelligence unit. The remote operator or unit can operate the vehicle or issue commands to the autonomous vehicle to be executed on various vehicle systems. The captured data sent to the remote operator/unit can be optimized to conserve bandwidth, such as by sending a limited subset of the captured data.

According to an embodiment of the present invention, the glass sheet is made of glass which may belong to different categories with the particularity of having an absorption coefficient comprised between 5 m$^{-1}$ and 15 m$^{-1}$ in the wavelength range from 750 to 1650 nm. The glass can thus be a soda-lime-silica type glass, alumino-silicate, borosilicate, . . . .

Preferably, the glass sheet having a high level of near infrared radiation transmission is an extra-clear glass.

Preferably, the base glass composition of the invention comprises a total content expressed in weight percentages of glass:

| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base glass composition comprises according to the invention in a content, expressed as total weight of glass percentages:

| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

More preferably, for reasons of lower production costs, the at least one glass sheet according to the invention is made of soda-lime glass. Advantageously, according to this embodiment, the base glass composition comprises a content, expressed as the total weight of glass percentages:

| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

In addition to its basic composition, the glass may include other components, nature and adapted according to quantity of the desired effect.

A solution proposed in the invention to obtain a very transparent glass in the high infrared (IR), with weak or no impact on its aesthetic or its color, is to combine in the glass composition a low iron quantity and chromium in a range of specific contents.

Thus, according to a first embodiment, the glass sheet preferably has a composition which comprises a content, expressed as the total weight of glass percentages:

| Fe total (expressed as $Fe_2O_3$) | 0.002-0.06% |
| $Cr_2O_3$ | 0.0001-0.06%. |

Such glass compositions combining low levels of iron and chromium showed particularly good performance in terms of infrared reflection and show a high transparency in the visible and a little marked tint, near a glass called "extra-clear". These compositions are described in international applications WO2014128016A1, WO2014180679A1, WO2015011040A1, WO2015011041A1, WO2015011042A1, WO2015011043A1 and WO2015011044A1, incorporated by reference in the present application. According to this first particular embodiment, the composition preferably comprises a chromium content (expressed as Cr2O3) from 0.002 to 0.06% by weight relative to the total weight of the glass. Such contents of chromium it possible to further improve the infrared reflection.

According to a second embodiment, the glass sheet has a composition which comprises a content, expressed as the total weight of glass percentages:

| Fe total (expressed as $Fe_2O_3$) | 0.002-0.06% |
| $Cr_2O_3$ | 0.0015-1% |
| Co | 0.0001-1%. |

Such chromium and cobalt based glass compositions showed particularly good performance in terms of infrared transmission while offering interesting possibilities in terms of aesthetics/color (bluish neutrality to intense coloration even up opacity). Such compositions are described in European patent application No. 13 198 454.4, incorporated by reference herein.

According to a third embodiment, the glass sheets have a composition which comprises a content, expressed as the total weight of glass percentages:

| | |
|---|---|
| total iron (expressed as $Fe_2O_3$) | 0.02-1% |
| $Cr_2O_3$ | 0.002-0.5% |
| Co | 0.0001-0.5%. |

Preferably, according to this embodiment, the composition comprises: 0.06%<Total Iron≤1%.

Such compositions based on chromium and cobalt are used to obtain colored glass sheets in the blue-green range, comparable in terms of color and light transmission with blue and green glasses on the market, but with performances particularly good in terms of infrared transmission. Such compositions are described in European patent application EP15172780.7, and incorporated by reference into the present application.

According to a fourth embodiment, the glass sheet has a composition which comprises a content, expressed as the total weight of glass percentages:

| | |
|---|---|
| total iron (expressed as $Fe_2O_3$) | 0.002-1% |
| $Cr_2O_3$ | 0.001-0.5% |
| Co | 0.0001-0.5% |
| Se | 0.0003-0.5%. |

Such glass compositions based on chromium, cobalt and selenium have shown particularly good performance in terms of infrared transmission, while offering interesting possibilities in terms of aesthetics/color (gray neutral to slight staining intense in the gray-bronze range). Such compositions are described in the application of European patent EP15172779.9, and incorporated by reference into the present application.

According to a first alternative embodiment, the glass sheet has a composition which comprises a content, expressed as the total weight of glass percentages:

| | |
|---|---|
| total iron (expressed as $Fe_2O_3$) | 0.002-0.06% |
| $CeO_2$ | 0.001-1%. |

Such compositions are described in European patent application No. 13 193 345.9, incorporated by reference herein.

According to another alternative embodiment, the glass has a composition which comprises a content, expressed as the total weight of glass percentages:

| | |
|---|---|
| total iron (expressed as $Fe_2O_3$) | 0.002-0.06%; | and one of the following components:
manganese (calculated as MnO) in an amount ranging from 0.01 to 1% by weight;
antimony (expressed as $Sb_2O_3$), in an amount ranging from 0.01 to 1% by weight;
arsenic (expressed as $As_2O_3$), in an amount ranging from 0.01 to 1% by weight, or
copper (expressed as CuO), in an amount ranging from 0.0002 to 0.1% by weight.

Such compositions are described in European patent application No. 14 167 942.3, incorporated by reference herein.

According to the present invention, the automotive glazing may be in the form of planar sheets. The glazing may be curved. This is usually the case for automotive glazing as for rear windows, side windows or roofs or especially windshields.

In automotive applications, the presence of high transmission glass sheet in the infrared is not conducive for maintaining thermal comfort when the vehicle is exposed to sunlight. A proposed means of the invention is to provide a glazing with a high selectivity (TL/TE), preferably with a selectivity greater than 1 or greater than 1.3. Thus, to remain under appropriate conditions of energy transmission and thermal comfort, apart from the already specified elements, the glazing according to the invention comprises means to selectively filtering the infrared from sun radiation.

Alternatively, it may be advantageous to use in combination with the glass according to the invention, a filtering layer having an IR transmission lower than 50, 40, 35, 30, 25, 20, 15, 10, 5, 4, 3, 2 or 1%.

Advantageously, the infrared filter is a reflective layer with a multilayer stack comprising n-layer (s) functional (s) based on a material that reflects infrared radiation, with n≥1, and n+1 dielectric coatings such that each functional layer is surrounded by dielectric coatings.

The functional layers, part of the infrared reflecting layers are advantageously formed from noble metal. They can be based on silver, gold, palladium, platinum or their mixture or alloy, but also based on copper or aluminum, alone, alloy or alloy with one or more noble metals. Preferably all the functional layers are based on silver. It is a noble metal that has a very high efficiency of reflection of infrared radiation. It is easily implemented in a magnetron device and its cost is not prohibitive, especially with regard to its effectiveness. Advantageously, the silver is doped with a few percent palladium, aluminum or copper, for example because of 1 to 10% by mass, or can be used a silver alloy.

Dielectrics, transparent coatings, part of infrared reflective layers are well known in the field of films deposited by sputtering. Suitable materials are many and it is not useful to make the full list here. These are generally oxides, oxynitrides or metal nitrides. Among the most common include for example SiO2, $TiO_2$, $SnO_2$, ZnO, ZnAlOx, $Si_3N_4$, AlN, $Al_2O_3$, $ZrO_2$, $Nb_2O_5$, $YO_x$ $TiZrYO_x$, $TiNbo_x$, $HfO_x$, MgOx, $TaO_x$, CrOx and $Bi_2O_3$, and mixtures thereof. One can also cite the following materials: AZO, ZTO, GZO, NiCrOx, TXO, ZSO, TZO, TNO TZSO, TZAO and TZAYO. The term AZO relates to a zinc oxide doped with aluminum or a mixed oxide of zinc and aluminum, obtained preferably from a ceramic target formed by the oxide to be deposited, sprayed either neutral or slightly oxidizing atmosphere. Similarly, the ZTO or GZO expressions relate respectively to mixed oxides of titanium and zinc or zinc and gallium, obtained from ceramic targets, either in a neutral or slightly oxidizing atmosphere. The term TXO relates to titanium oxide obtained from a titanium oxide ceramic target. The ZSO term refers to a mixed zinc-tin oxide obtained either from a metal target of alloy deposited in an oxidizing atmosphere or from a ceramic target of the corresponding oxide or neutral atmosphere or slightly oxidizing. TZO TNO TZSO, TZAO or TZAYO expressions relate respectively to mixed titanium zirconium oxides, titanium-niobium, titanium-zirconium-tin, titanium-zirconium-aluminum or titanium-zirconium-aluminum-yttrium, obtained from ceramic targets, either neutral or slightly oxidizing atmosphere. All these above mentioned materials can be used to form the dielectric films used in the present invention.

Preferably, the dielectric coating disposed under one or each functional layer includes, in direct contact with the functional layer or layers, a layer based on zinc oxide, optionally doped for example with aluminum or gallium, or alloy with tin oxide. The zinc oxide can have a particularly favorable effect on the stability and the corrosion resistance of the functional layer, especially when it comes to money. It is also conducive to the improvement of the electrical conductivity of a silver-based layer, and thus obtaining a low emissivity.

The different layers of the stack are, for example, sputtered under reduced pressure magnetron sputtering, in a known magnetron device. The present invention is however not limited to this particular method of layer deposition.

According to a particular embodiment of the invention, these layers of assemblies may be arranged either on a carrier sheet, in particular of PET, inserted in the laminated, either by direct application on the glass sheet.

As an alternative to metal layers on the basis described above, the infrared reflective layer can include a plurality of non-metallic layers, so that it operates as a band pass filter (the band being centered near the region infrared electromagnetic spectrum).

According to a preferred embodiment of the invention, the automotive glazing is a laminated glazing comprising an exterior and an interior glass sheets laminated with at least one thermoplastic interlayer and wherein the exterior and an interior glass sheets are high level of near infrared radiation transmission glass sheets having an absorption coefficient comprised between 5 $m^{-1}$ and 15 $m^{-1}$ in the wavelength range from 750 to 1650 nm. The layer reflecting infrared radiation is then preferably placed on face 2 meaning on the inner face of the first glass sheet which is mounted on the vehicle and being in contact with the external environment.

According to another embodiment of the present invention, the infrared filter is a thermoplastic interlayer absorbing infrared rays. Such thermoplastic interlayer is for example a PVB doped with an ITO.

According to another embodiment of the present invention, the infrared filter is a tinted glass.

According to one embodiment of the present invention, the glass sheet has a value of light transmission lower than the value of infrared transmission. Particularly, according to another embodiment of the present invention, the value of light transmission in the visible range is lower than 10% and the value of near infrared transmission is higher than 50%.

According to another advantageous embodiment of the invention, the glass sheet is covered with at least one IR transparent absorbing (tinted) and/or reflecting coating in order to hide the un-aesthetic element of the sensor from the outside while ensuring a good level of operating performances. This coating may, for example, be composed of at least one layer of black ink having no (or very low) transmission in the visible optical range but having a high transparency in the infrared range of interest for the application. Such ink can be made of organic compounds as, for example, commercial products manufactured by Seiko Advance Ltd. Or Teikoku Printing Ink Mfg. Co. Ltd. that can achieve transmission<5% in the 400-750 nm range and >70% in the 750-1650 nm range. The coating may be provided on face(s) 1 or/and 4 for a laminated automotive glazing, depending of its durability.

According to another embodiment of the invention, the glass sheet may be covered with a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition. The coating may be provided on face(s) 1 or/and 4 for a laminated automotive glazing, depending of its durability.

According to the present invention, a LiDAR instrument is an optoelectronic system composed of at least a laser transmitter, at least a receiver comprising a light collector (telescope or other optics) and at least a photodetector which converts the light into an electrical signal and an electronic processing chain signal that extracts the information sought.

Preferably, the LiDAR is placed in the upper part of the glazing and more preferably closed to the mirror holder.

According to another embodiment of the present invention, the automotive glazing is a laminated glazing wherein the LiDAR is placed on the internal face of the inner glass sheet namely the face 4 on a zone of the glass sheet wherein the IR-filtering mean is not present.

According to a preferred embodiment of the present invention, the automotive glazing is a windshield. Thus, the infrared-based remote sensing device is placed on face 4 of the windshield on a zone free of infrared reflective layer. Indeed, in case of an infrared reflective coating, a zone free of coating is provided for example by decoating or by masking in a way that the LiDAR is positioned on this area without coating on face 4 to insure its functionalities. The coating free area has generally the shape and dimensions of the infrared-based remote sensing device. In case of an infrared absorbing film, the film is cut in the dimensions of the LiDAR that the LiDAR is positioned on this area without film to insure its functionalities.

According to one embodiment of the present invention, the automotive glazing is ultrathin glazing.

Advantageously, the IR-based remote sensing device is optically coupled to the internal face of the glazing. For example, a soft material that fits refractive index of the glass and the external lens of the LiDAR may be used.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. Such coating may be provided on face(s) 1 or/and 4 for a laminated glazing. A textured glass sheet may be also used. Etching or coating techniques may as well be used in order to avoid reflection.

The present invention concerns also a method to produce a laminated according to the present invention.

The invention will be For avoidance of doubt, the terms "external" and "internal" refer to the orientation of the pane substrate or more particularly to a glass pane substrate during installation as glazing in a vehicle.

Figure 1:
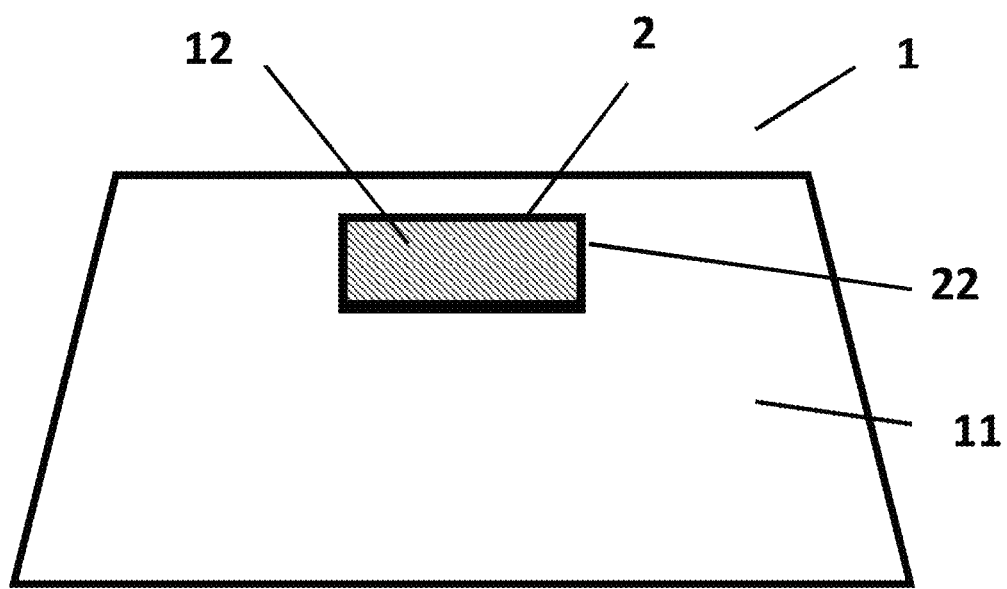
FIG. 1 is a plan view of the glazing according to the present invention, with an optically transparent sensor area according to the invention.
Figure 2:
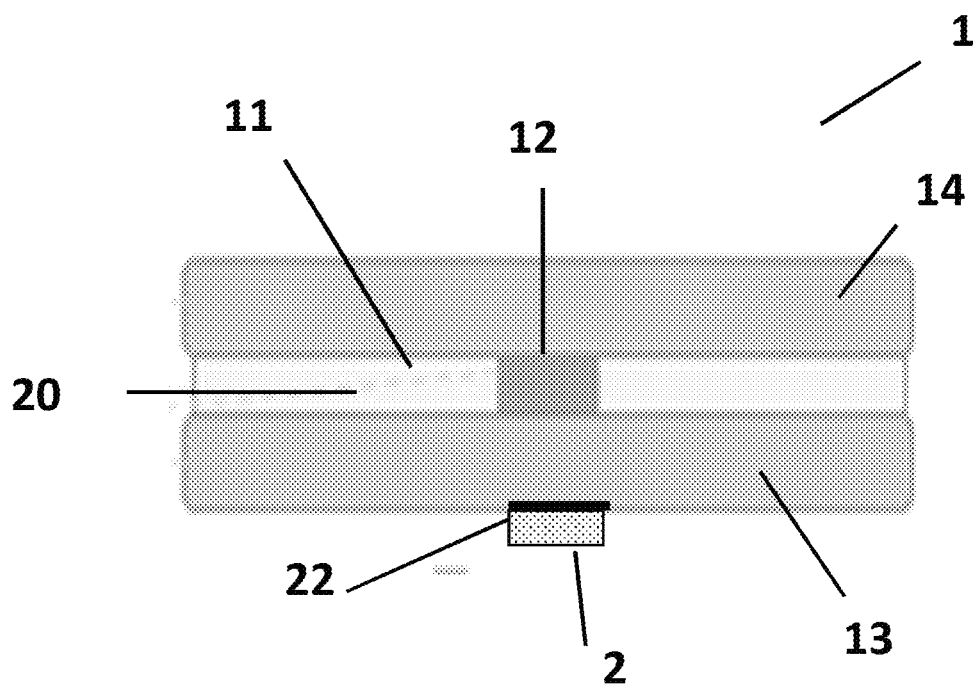
FIG. 2 is a cross view of the glazing according to the present invention, with an optically transparent sensor area according to the invention.

FIGS. 1 and 2, according to an embodiment of the invention, represent an automotive glazing. The automotive glazing 1 is a laminated glazing comprising an outer 14 and an inner 13 glass sheets laminated with at least one thermoplastic interlayer with a LiDAR sensor 2 as optical sensor device, integrated on a windshield 1. According to the present invention, from the front view, the thermoplastic interlayer 20 is divided into two zones: a first zone 11 in the major surface of the windshield and the second zone 12 wherein the optically transparent area 22 is present. For the major surface 11, the thermoplastic interlayer is made of PVB and the second zone 12 is made of EVA or COP or PU. The second zone 12 is more transparent to infrared radiations than the PVB. In the optically transparent area 22 where the LiDAR sensor 2 is integrated, it is needed to transmit the used IR light as much as possible to ensure optimal performances of the LiDAR sensor. According to the present invention, the LiDAR 2 and more generally speaking the optical device will be provided in inner face of the inner glass sheet also called face 4.

According to the present embodiment of this invention, the second zone 12 of the thermoplastic interlayer is a die-cut EVA, COP or PU interlayer material insert which is assembled with the first zone 11 of the thermoplastic interlayer 20 during the lamination process for cost saving. For example, a frame cut in the size of the optically transparent area 22 and more particularly of the size of the optical sensor device 2 is made in order to insert in the frame cut the "second zone" 12 of the thermoplastic interlayer having a transparency to IR higher than the first zone 11.

The optical sensor device is then placed in face 4 behind the optically transparent area 22.

According to another embodiment of this invention, the first zone 11 of the thermoplastic interlayer 20 is a thermoplastic interlayer absorbing infrared rays also such as a PVB doped with an inorganic or organic material also called IR cut-PVB.

As an inorganic material based infrared thermoplastic interlayer, for example, a material selected from a metal, an oxide, a nitride, and a sulfide of Sn, Ti, Si, Zn, Zr, Fe, Al, Cr, Co, Ce, In, Ni, Ag, Cu, Pt, Mn, Ta, W, V, and Mo; or a material that is obtained by doping Sb or F to these can be considered. An inorganic material based infrared thermoplastic interlayer may particularly preferably be a tin oxide in which antimony is doped, or an indium oxide in which is doped. When an infrared material is a particulate, it's particle diameter is not particularly limited. However, it may be less than or equal to 0.2 μm, for example, and it can be in a range from 0.0001 μm to 0.15 μm, for example.

As an organic material based infrared thermoplastic interlayer, for example, the following can be considered: a diimonium-based pigment, an anthraquinone-based pigment, an aminium-based pigment, a cyanine-based pigment, a merocyanine-based pigment, a croconium-based pigment, a squarylium-based pigment, an azulenium-based pigment, a polymethine-based pigment, a naphthoquinone-based pigment, a pyrylium-based pigment, a phthalocyanine-based pigment, a naphthalocyanine pigment, a naphtholoctam-based pigment, an azo-based pigment, a condensed azo-based pigment, an indigo-based pigment, a perynone-based pigment, a perylene-based pigment, a dioxazine-based pigment, a quinacricone-based pigment, an isoindlinone-based pigment, a quinophthalone-based pigment, a pyrrole-based pigment, a thioindigo-based pigment, a metal complex-based pigment, a dithiol-based metal complex pigment, an indole phenol-based pigment, a triarylmethane-based pigment, and so forth. An organic material based infrared thermoplastic interlayer may particularly preferably be a phthalocyanine-based pigment.

According to this embodiment, the second zone 12 of the thermoplastic interlayer may be made of a "classical PVB" or other interlayers like EVA, COP or PU. The second zone 12 may be a die-cut PVB interlayer material insert which is assembled with the first zone 11 of the thermoplastic interlayer 20 during the lamination process for cost saving. For example, a frame cut in the size of the optically transparent area 22 and more particularly of the size of the optical sensor device 2 is made in order to insert in the frame cut the "second zone" 12 of the thermoplastic interlayer having a transparency to IR higher than the first zone 11.

The optical sensor device is then placed in face 4 behind the optically transparent area 22.

According to an embodiment of the present invention the windshield is curved and an masking band (not shown) is provided in order to hide anesthetic components and to protect from UV glue used to fix some component commonly used for windshield.

According to the present invention, several optical devices including optical sensors may be provided on the substrate, in that case, the number of "second zones" patched should be adapted consequently.

The invention claimed is:

1. A laminated glazing with an optically transparent area comprising:
    at least one inner glass sheet and one outer glass sheet, each having an internal and an external face, at least one of the one inner glass sheet and the one outer glass sheet having an absorption coefficient less than $15\ m^{-1}$ in the wavelength range from 750 to 1650 nm;
    at least one thermoplastic interlayer to laminate the at least one inner and outer glass sheets, comprising at least a first zone and a second zone, the second zone being delimited by the optically transparent area; and
    at least one optical sensor device provided on the inner face of the inner glass sheet integrated in the optically transparent area,
    wherein in the second zone of the thermoplastic interlayer delimited by the optically transparent area, the laminated glazing has a value of infrared transmission TIR1 higher than a value of infrared transmission TIR2 of the first zone for working wavelengths of the optical sensor device, and
    wherein the first zone of the thermoplastic interlayer is made of polyvinyl butyral and a material of the thermoplastic interlayer of the second zone is selected from the group consisting of ethylene vinyl acetate, Cyclic olefin polymer (COP), and polyurethane.

2. The laminated glazing according to claim 1, wherein the first zone of the thermoplastic interlayer is made of polyvinyl butyral and the second zone of the thermoplastic interlayer is made of a material having a TIR at the working wavelength of the optical sensor device higher than the polyvinyl butyral, so that TIR1 for the laminated glazing at the first zone is higher than TIR2 at the second zone.

3. The laminated glazing according to claim 1, wherein the the toplastic interlayer comprises the first zone made of polyvinyl butyral covering a main surface of the glazing and provided with a frame wherein a piece of thermoplastic interlayer of the second zone is selected from the group consisting of ethylene vinyl acetate, Cyclic olefin polymer (COP), and polyurethane and is placed inside the frame.

4. The laminated glazing according to claim 1, wherein the at least one optical sensor device is an infrared-based remote sensing device in the wavelength range from 750 to 1650 nm, and is placed on the internal face of the inner glass sheet.

5. The laminated glazing according to claim 1, wherein a system of infrared filter layers is provided between the inner and the outer glass sheets with a zone free of the system of infrared filter layers within the optically transparent area.

6. The laminated glazing according to claim 5 wherein the system of infrared filter layers is a coating wherein a decoating zone is provided on which an infrared-based remote sensing device is placed.

7. The laminated glazing according to claim 5, wherein the system of infrared filter layers is silver-based.

8. The laminated glazing according to claim 1, wherein the at least one inner and outer glass sheets are covered with at least one near-infrared transparent coating that absorbs and/or reflects the visible light.

9. The laminated glazing according to claim 1, wherein the at least one optical sensor device is a LIDAR system based on scanning, rotating or solid state LiDARs and enabling of 3D mapping the surroundings around a vehicle.

10. The laminated-glazing according to claim 1, wherein the at least one optical sensor device is optically coupled to the internal face of the glazing.

11. The laminated glazing according to claim 1, wherein an anti-reflective coating is provided on a surface of the laminated glazing.

12. The laminated glazing according to claim 1, wherein at least one of the one inner glass sheet and the one outer glass sheet has an absorption coefficient between $5\ m^{-1}$ and $15\ m^{-1}$ in the wavelength range from 750 to 1650 nm.

13. The laminated glazing according to claim 1, wherein the at least one inner and one outer glass sheets comprise a content, expressed as the total weight of glass percentages:
total iron (expressed as Fe2O3) 0.002 to 1%,
Cr2O3 0.0001 to 1%, and
Co 0.0001 to 0.5%.

14. The laminated glazing according to claim 1, wherein the laminated glazing is a windshield.

15. The laminated glazing according to claim 2, wherein the TIR1 for the laminated glazing at the second zone is 90% higher than the TIR2 at the first zone.

16. The laminated glazing according to claim 4, wherein the at least one optical sensor device is an infrared-based remote sensing device in the wavelength range from 1530 nm to 1560 nm.

17. A laminated glazing with an optically transparent area comprising:
   at least one inner glass sheet and one outer glass sheet, each glass sheet having an internal and an external face;
   at least one thermoplastic interlayer to laminate the at least one inner and outer glass sheets, comprising at least a first zone and a second zone, the second zone being delimited by the optically transparent area; and
   at least one optical sensor device provided on the inner face of the inner glass sheet integrated in the optically transparent area,
   wherein in the second zone of the theimoplastic interlayer delimited by the optically transparent area the laminated glazing has a value of infrared transmission TIR1 higher than a value of infrared transmission TIR2 of the first zone for working wavelengths of the optical sensor device, and
   wherein the thermoplastic interlayer comprises the first zone made of polyvinyl butyral covering a main surface of the glazing and provided with a frame wherein a piece of thermoplastic interlayer of the second zone is selected from the group consisting of ethylene vinyl acetate, Cyclic olefin polymer (COP), and polyurethane and is placed inside the frame.

* * * * *